Nov. 17, 1936.　　　F. A. ANETSBERGER　　　2,061,533
COOKING UTENSIL
Filed Dec. 3, 1934　　　2 Sheets-Sheet 1
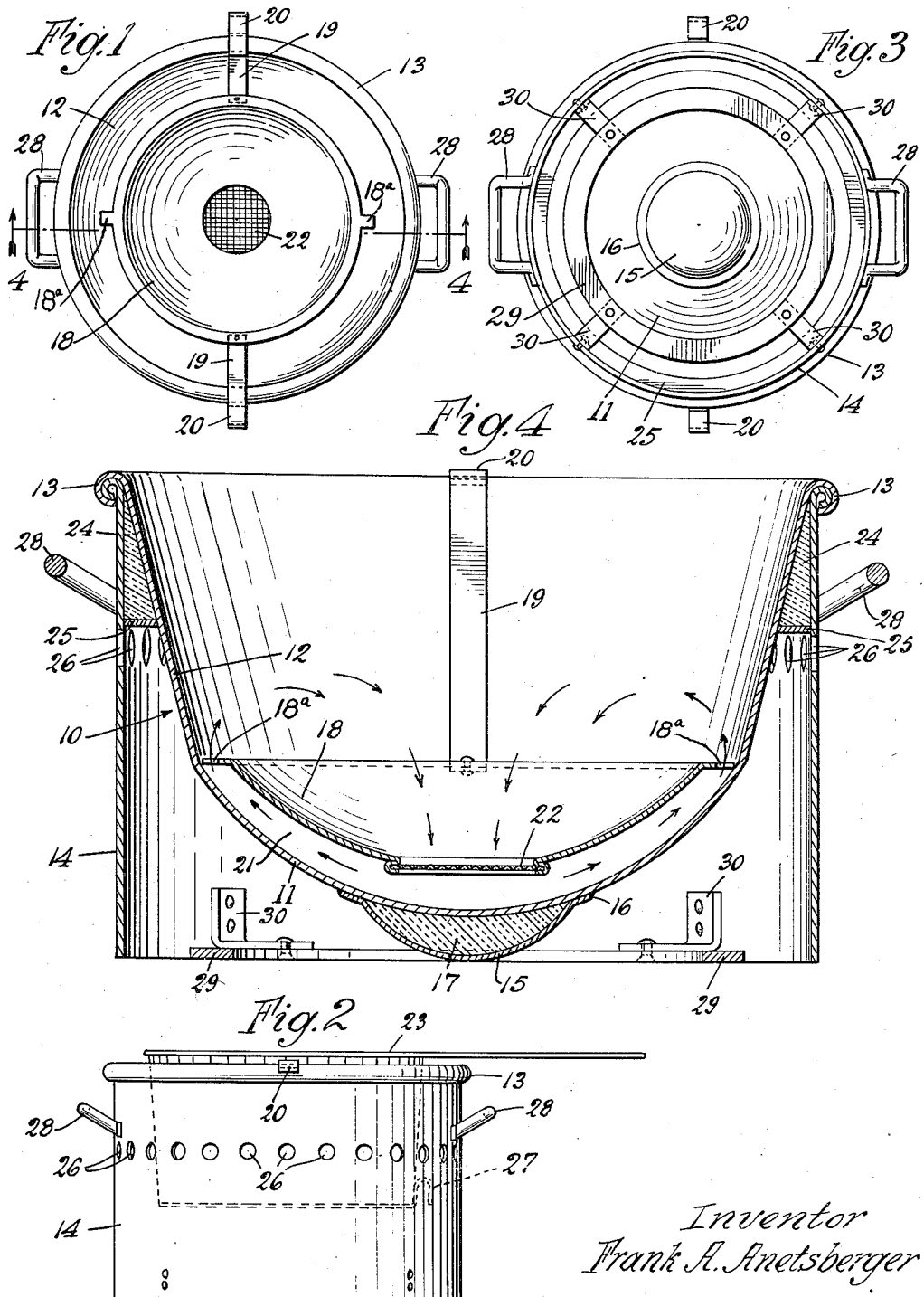
Inventor
Frank A. Anetsberger
by Maxwell F. Cargill
Attorney.

Nov. 17, 1936.  F. A. ANETSBERGER  2,061,533
COOKING UTENSIL
Filed Dec. 3, 1934  2 Sheets-Sheet 2

Inventor
Frank A. Anetsberger
by Maxwell F. Cargill
Attorney.

Patented Nov. 17, 1936

2,061,533

UNITED STATES PATENT OFFICE 2,061,533

COOKING UTENSIL

Frank A. Anetsberger, Chicago, Ill.

Application December 3, 1934, Serial No. 755,689

2 Claims. (Cl. 53—1)

This invention relates to improvements in cooking utensils.

One object of the invention is to provide an improved utensil for use in cooking food products such as doughnuts, potatoes, potato chips, fish or the like, in so-called deep fat, the apparatus being arranged to prevent the scorching and charring of the particles of food which tend to settle to the bottom of the containers.

A further object of the invention is to provide a cooking utensil having a heat insulated bottom portion which in cooperation with a removable tray effects a circulation of the liquid in such manner as to cause crumbs or other food particles to be collected by the tray, which being spaced from the hot surface of the utensil, prevents scorching and charring of such particles and thus the fouling of the cooking liquid.

Other objects relate to various features of construction and arrangement of parts which will be apparent from a consideration of the following specification and accompanying drawings wherein, Figure 1 is a top plan view of a cooking utensil embodying the present improvements.

Figure 2 is a side elevation thereof.

Figure 3 is a bottom plan view of the utensil.

Figure 4 is a vertical sectional view taken on line 4—4 of Figure 1.

Figure 5:
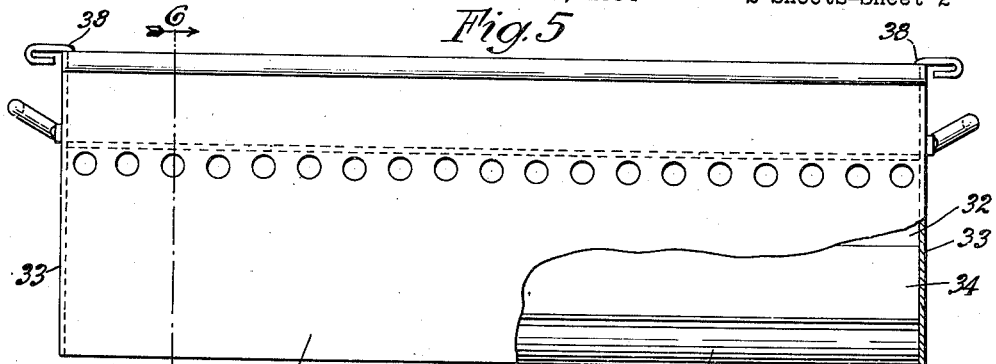
Figure 5 is a broken side elevation of a slightly modified form of the utensil.

Referring to Figures 1 to 4 inclusive, the utensil is shown as comprising an oil or deep fat receptacle or container indicated generally by the numeral 10 having a semi-spherical bottom 11 which merges into the upwardly flaring side walls 12. The upper edge of the container is seamed or otherwise connected in any appropriate manner at 13 to a depending skirt 14 which, as is shown in Figure 4, is spaced from the container 10.

Secured to the lower central portion of the exterior of the bottom 11 is an insulating member comprising a dished plate 15 which is welded at its edge 16 to the curved wall 11. Heat insulating material 17 preferably such as mineral wool or the like is positioned between the member 15 and the bottom wall 11 for the purpose hereinafter mentioned.

A tray 18 also preferably semi-spherical in shape and conforming in contour generally to the shape of the bottom 11 is removably supported in the container by any approved means such as the strap-metal hangers 19, having outwardly turned ends 20 which extend over the upper edge of the utensil.

As illustrated in Figure 4, the tray 18 is spaced at its margin from the container 10 and is spaced vertically from the curved bottom 11 to provide a circulating passage 21. The central portion of the tray 18 is provided with a screen or other foraminous member 22 which is disposed in alignment with the insulated portion of the bottom 11.

The utensil is adapted to be placed over a fire such as a gas burner or the like with the deep fat, oil, or other cooking liquid in the container 10.

A wire basket 23 or the like, containing the food products to be cooked, is lowered into the hot liquid for cooking in the usual manner. The insulated portion of the bottom 11 tends to keep the oil immediately above the same at slightly lower temperature than the surrounding oil, with the result that convection currents are set up which follow the directions indicated by the arrows, that is, the current flows downwardly through the strainer 22 and thence laterally through the passage 21. Most of the crumbs which separate from the food particles in the basket 23, will be entrapped by the tray and thus prevented from settling on the hot bottom 11 and becoming scorched or charred, and thus befouling the cooking liquid.

The current of the liquid flowing laterally and upwardly through the passage 21 prevents crumbs from passing into said passage 21 and thus settling on the bottom 11, as will be seen, since such crumbs gravitating along the inclined walls 12 will be deflected over and into the tray 18. The cooking liquid is thus prevented from becoming contaminated, since the tray can readily be lifted by the hangers 19 and the crumbs and food particles readily removed therefrom. The surrounding skirt 14 directs the hot air and gases from the source of heat upwardly against the outer surface of the receptacle 10, which increases the efficiency of the utensil.

As illustrated, the upper portion of the space between the receptacle 10 and the skirt may be packed with mineral wool 24 and held in position by an annular plate 25 which may be welded to the skirt 14 and the receptacle 10.

The tray 18 preferably has spacing ears 18a at its upper edge to facilitate the central disposition of the tray within the receptacle 10.

Immediately below the plate 25 the skirt is provided with an annular row of outlet ports 26 through which the hot air and products of combustion escape.

The insulation 24 prevents the upper portion of the container wall 12 from becoming excessively hot, and causing the fat or oil to smoke. The insulation 24 thus preferably extends slightly below the normal liquid level in the container.

When the food products have been cooked, the basket 23 is lifted from the liquid and by means of a hook 20 carried by the basket it may be supported temporarily on the upper edge of the utensil until surplus liquid has drained back into the container.

The utensil preferably has conventional handles 28 by means of which it can be lifted.

To prevent accidental tipping of the utensil should it be placed on the edge of a stove, for example, a ring 29 may be provided of smaller diameter than the diameter of the skirt 14 and secured to the latter by means of ears or brackets 30. The ring 29 is disposed in the plane of the lower edge of the skirt 14.

Figure 7:
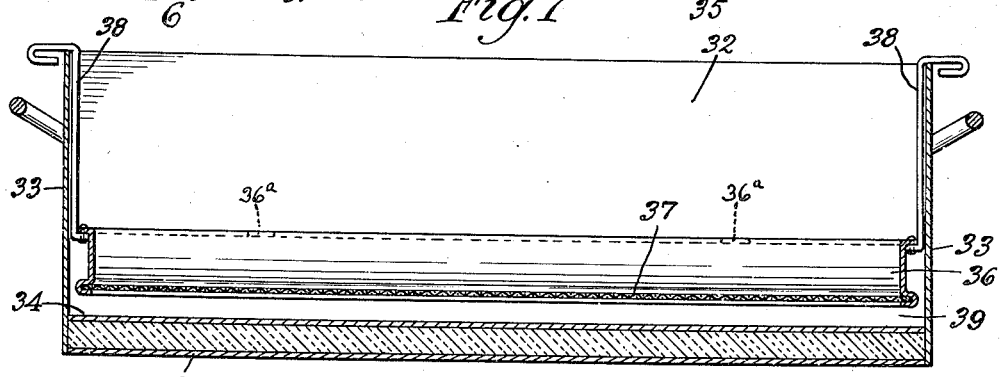
Figure 7 is a longitudinal vertical sectional view taken on line 7—7 of Figure 6.
Figure 6:
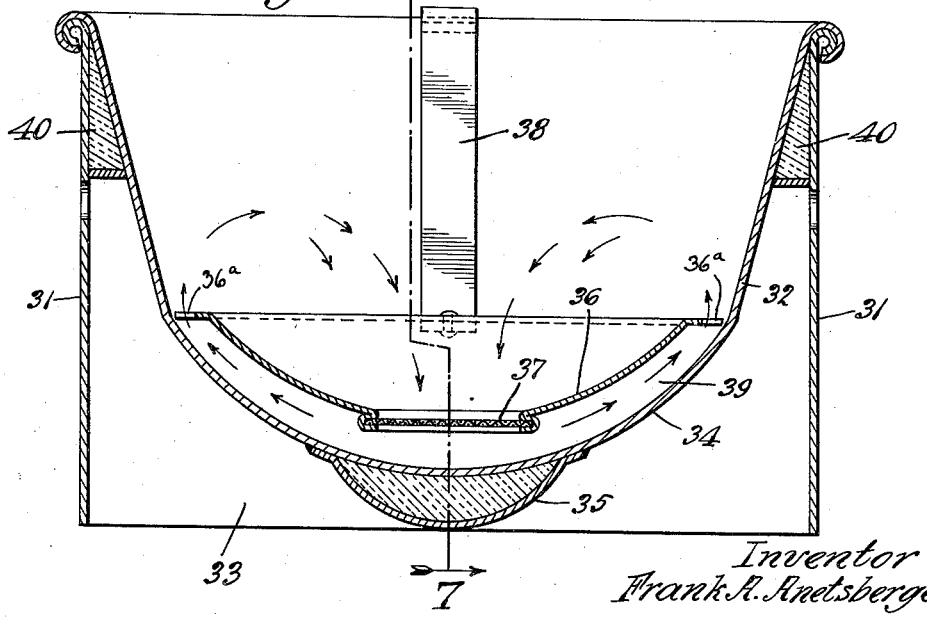
Figure 6 is a transverse vertical sectional view taken on line 6—6 of Figure 5.

The modification of the invention illustrated in Figures 5, 6, and 7, is similar to the form above described, except that it is elongated to enable the same to be placed over several gas burners, for example. In this form of the invention, the skirt 31 is rectangular in horizontal section. The container 32 has its ends closed by the end plates 33 by welding the same together, for example. The bottom 34 of the container is curved in transverse section and has the insulating member 35 extending longitudinally thereof. The tray 36 extends substantially the full length of the interior of the receptacle and has a longitudinally extending strainer 37. The tray is supported in spaced relation with reference to the bottom 34 by brackets or hangers 38, and is spaced from the side walls by spacing ears 36a.

The circulation of the cooking liquid will be downwardly through the strainer 37 and then laterally through the passage 39 as indicated by the arrows. By means of the present improvements, the deep fat or oil or other cooking liquid is kept substantially free of particles of food and due to the insulation 40 which extends beneath the normal level of the liquid, the burning and smoking of the oil at its surface is prevented. Thus the offensive odors are not given off where the present utensil is employed, and befouling of the oil by the charring of food particles is avoided.

While I have shown and described certain embodiments of my invention for the purpose of illustration, I do not wish to be restricted specifically thereto except as so limited by the appended claims.

I claim:

1. A cooking utensil comprising a liquid container provided with upwardly directed side walls and a curved bottom, a heat insulating member positioned centrally of said bottom to insulate a central column of liquid thereabove, said bottom having an unobstructed concave inner surface providing a smooth unobstructed path for the passage of convection currents moving laterally along said bottom in a direction away from said central portion and toward said side walls, and a removable tray provided with handle means for engaging the receptacle for supporting the tray in position therein, said tray being shaped in substantial conformity with said bottom and spaced therefrom to provide a passage arcuate in cross section between said tray and bottom for the laterally moving liquid, said tray being spaced at the margin thereof from the inner surface of the container and provided with a screened opening above said insulating member whereby the application of heat to the bottom establishes convection currents comprising the insulated column of liquid which descends through said screened opening to effect the accumulation of food particles within the tray and the laterally directed streams which flow through said passage past the margin of the tray and thence inwardly of the container to join the descending column.

2. A cooking utensil adapted for use over a conventional source of heat comprising a liquid container having a convex bottom, a removable tray disposed in said container beneath the liquid providing space adjacent the margin thereof for the upward flow of liquid, said container having a lower convex surface spaced from said bottom to define a passage therebetween, means removably supporting said tray in said spaced relation with respect to said bottom, a screened port in the lower portion of said tray, and a heat insulating member disposed centrally of said bottom beneath said port for insulating the central column of liquid thereabove whereby application of heat to said bottom effects the establishment of convection currents within the container comprising the insulated central column which flows downwardly through said port and currents flowing radially from said port through said passage and upwardly past the margin of the tray and thence inwardly to join the descending column.

FRANK A. ANETSBERGER.